US012610342B2

(12) United States Patent
Keating et al.

(10) Patent No.: US 12,610,342 B2
(45) Date of Patent: Apr. 21, 2026

(54) REPORTING INTEGRITY MEASUREMENT ERROR DISTRIBUTION GROUPS

(71) Applicant: Nokia Technologies Oy, Espoo (FI)

(72) Inventors: Ryan Keating, Naperville, IL (US); Hyun-Su Cha, Naperville, IL (US)

(73) Assignee: Nokia Technologies Oy, Espoo (FI)

( * ) Notice: Subject to any disclaimer, the term of this patent is extended or adjusted under 35 U.S.C. 154(b) by 377 days.

(21) Appl. No.: 18/494,383

(22) Filed: Oct. 25, 2023

(65) Prior Publication Data

US 2024/0155548 A1     May 9, 2024

Related U.S. Application Data

(60) Provisional application No. 63/382,164, filed on Nov. 3, 2022.

(51) Int. Cl.
*H04W 64/00* (2009.01)

(52) U.S. Cl.
CPC ....... *H04W 64/003* (2013.01); *H04W 64/006* (2013.01)

(58) Field of Classification Search
CPC . H04W 64/003; H04W 64/006; H04W 24/10; H04W 64/00; G01S 5/0036; G01S 5/0244
See application file for complete search history.

(56) References Cited

U.S. PATENT DOCUMENTS 10,473,791 B1    11/2019  Wang et al.
12,167,363 B2 *  12/2024  Zhang ................... H04W 64/00

2015/0350850 A1    12/2015  Edge
2017/0332192 A1 *  11/2017  Edge ..................... H04W 64/00
2022/0034992 A1     2/2022  Kuo et al.
(Continued)

FOREIGN PATENT DOCUMENTS

WO    WO-2021115687 A1 *   6/2021   ............ H04W 24/10
WO    WO-2021198983 A1 *  10/2021   ............ H04W 64/00
WO       2021/242951 A1    12/2021
(Continued)

OTHER PUBLICATIONS

Extended European Search Report received for corresponding European Patent Application No. 23206286.9, dated Apr. 9, 2024, 12 pages.
(Continued)

*Primary Examiner* — Wesley L Kim
*Assistant Examiner* — Erkin Abdullaev
(74) *Attorney, Agent, or Firm* — Barta Jones, PLLC

(57) ABSTRACT

Reporting integrity measurement error distribution groups is provided. An apparatus may include at least one processor, and at least one memory storing instructions that, when executed by the at least one processor, cause the apparatus at least to communicate, with a network device, information that may include one or more integrity distribution groups (IDGs) and corresponding distribution parameters. The apparatus may further perform positioning measurements for positioning integrity and determine one of the one or more IDGs based on at least one of the positioning measurements. A report is transmitted to the network device that may include at least one of the positioning measurements or an identifier of the determined IDG.

18 Claims, 4 Drawing Sheets

(56) References Cited

U.S. PATENT DOCUMENTS

2022/0061014 A1     2/2022  Sundararajan et al.
2024/0357549 A1*  10/2024  Lou ..................... H04W 64/006

FOREIGN PATENT DOCUMENTS

WO        2022/055679  A1     3/2022
WO        2022/155647  A1     7/2022
WO        2022/212484  A1    10/2022

OTHER PUBLICATIONS

"Discussion on NR positioning measurement accuracy improvement based on carrier phase measurement", 3GPP TSG-RAN WG4 Meeting #104bis-e, R4-2216228, Agenda: 6.18.3, Nokia, Oct. 10-19, 2022, 5 pages.
"3rd Generation Partnership Project; Technical Specification Group Radio Access Network; NR; Physical layer procedures for data (Release 17)", 3GPP TS 38.214, V17.3.0, Sep. 2022, pp. 1-232.
"3rd Generation Partnership Project; Technical Specification Group Radio Access Network; LTE Positioning Protocol (LPP (Release 17)", 3GPP TS 37.355, V17.2.0, Sep. 2022, pp. 1-347.
"3rd Generation Partnership Project; Technical Specification Group Services and System Aspects; Service requirements for cyber-physical control applications in vertical domains; Stage 1 (Release 18)", 3GPP TS 22.104, V18.3.0, Dec. 2021, pp. 1-101.
"3rd Generation Partnership Project; Technical Specification Group Radio Access Network; Study on NR Positioning Enhancements; (Release 17)", 3GPP TR 38.857, V17.0.0, Mar. 2021, 545 pages.
"New SID on Study on expanded and improved NR positioning", 3GPP TSG RAN Meeting #94e, RP-213561, Agenda: 8.6.1, Intel, Dec. 6-17, 2021, 5 pages.
"FL summary #1 on integrity of RAT dependent positioning techniques", 3GPP TSG RAN WG1 #110b-e, R1-2210274, Agenda: 9.5.2.1, InterDigital, Inc, Oct. 10-19, 2022, 59 pages.
"3rd Generation Partnership Project; Technical Specification Group Radio Access Network; NG Radio Access Network (NG-RAN); Stage 2 functional specification of User Equipment (UE) positioning in NG-RAN (Release 17)", 3GPP TS 38.305, V17.2.0, Sep. 2022, pp. 1-133.
"Msc-generator", Sourceforge, Retrieved on Nov. 22, 2023, Webpage available at : https://sourceforge.net/projects/msc-generator/.
"Discussion on solutions for the integrity of RAT dependent positioning techniques", 3GPP TSG RAN WG1 #109-e, R1-2203468, Agenda: 9.5.2.1, CATT, May 9-20, 2022, pp. 1-6.

* cited by examiner

| IDG ID | Distribution Type | Mean(s) | Standard Deviation(s) |
|--------|-------------------|---------|-----------------------|
| 1 | Gaussian | (x1,-x1) | (y1,y2) |
| 2 | Gaussian | (x3,x4) | (y3,y4) |
| 3 | Uniform | (0,1) | (1,2) |

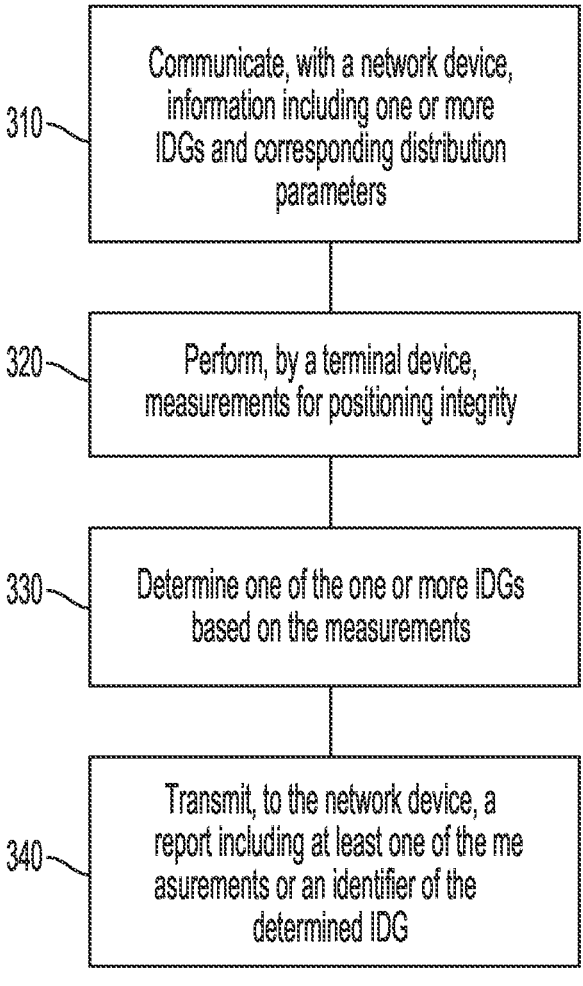

310 — Communicate, with a network device, information including one or more IDGs and corresponding distribution parameters 320 — Perform, by a terminal device, measurements for positioning integrity 330 — Determine one of the one or more IDGs based on the measurements 340 — Transmit, to the network device, a report including at least one of the measurements or an identifier of the determined IDG

FIG. 3

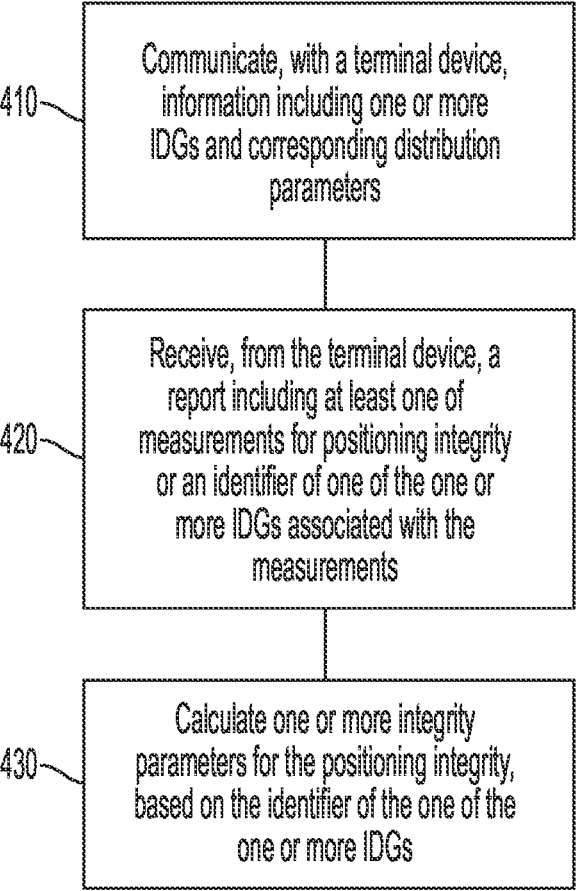

410 — Communicate, with a terminal device, information including one or more IDGs and corresponding distribution parameters 420 — Receive, from the terminal device, a report including at least one of measurements for positioning integrity or an identifier of one of the one or more IDGs associated with the measurements 430 — Calculate one or more integrity parameters for the positioning integrity, based on the identifier of the one of the one or more IDGs

FIG. 4

REPORTING INTEGRITY MEASUREMENT ERROR DISTRIBUTION GROUPS

CROSS-REFERENCE TO RELATED APPLICATION

This application claims the benefit of U.S. Provisional Application No. 63/382,164, filed Nov. 3, 2022. The entire content of the above-referenced application is hereby incorporated by reference.

TECHNICAL FIELD

Some example embodiments may generally relate to mobile or wireless telecommunication systems, such as Long Term Evolution (LTE) or fifth generation (5G) new radio (NR) access technology, or 5G beyond, or other communications systems. For example, certain example embodiments may relate to reporting integrity measurement error distribution groups.

BACKGROUND

Examples of mobile or wireless telecommunication systems may include the Universal Mobile Telecommunications System (UMTS) Terrestrial Radio Access Network (UTRAN), Long Term Evolution (LTE) Evolved UTRAN (E-UTRAN), LTE-Advanced (LTE-A), MulteFire, LTE-A Pro, and/or fifth generation (5G) radio access technology or new radio (NR) access technology. Fifth generation (5G) wireless systems refer to the next generation (NG) of radio systems and network architecture. 5G network technology is mostly based on new radio (NR) technology, but the 5G (or NG) network can also build on E-UTRAN radio. It is estimated that NR may provide bitrates on the order of 10-20 Gbit/s or higher, and may support at least enhanced mobile broadband (eMBB) and ultra-reliable low-latency communication (URLLC) as well as massive machine-type communication (mMTC). NR is expected to deliver extreme broadband and ultra-robust, low-latency connectivity and massive networking to support the Internet of Things (IoT).

SUMMARY

Various exemplary embodiments may provide a terminal device that includes at least one processor, and at least one memory storing instructions that, when executed by the at least one processor, cause the terminal device at least to communicate, with a network device, information that includes one or more integrity distribution groups (IDGs) and corresponding distribution parameters. The terminal device may also be caused to perform positioning measurements for positioning integrity and determine one of the one or more IDGs based on the positioning measurements. The terminal device may transmit, to the network device, a report comprising at least one of the positioning measurements or an identifier of the determined IDG.

Various exemplary embodiments may also provide a network device that includes at least one processor, and at least one memory storing instructions that, when executed by the at least one processor, cause the terminal device at least to communicate, with a terminal device, information that includes one or more integrity distribution groups (IDGs) and corresponding distribution parameters. The network device may be caused to receive, from the terminal device, a report that includes at least one of positioning measurements for positioning integrity or an identifier of one of the one or more IDGs associated with the positioning measurements. The network device may also calculate one or more integrity parameters for the positioning integrity, based on the identifier of the one of the one or more IDGs.

Certain exemplary embodiments may provide a terminal device that includes means for communicating, with a network device, information that includes one or more integrity distribution groups (IDGs) and corresponding distribution parameters. The terminal device may also include means for performing positioning measurements for positioning integrity and means for determining one of the one or more IDGs based on the positioning measurements. The terminal device may further include means for transmitting, to the network device, a report comprising at least one of the positioning measurements or an identifier of the determined IDG.

Certain exemplary embodiments may also provide a network device that includes means for communicating, with a terminal device, information that includes one or more integrity distribution groups (IDGs) and corresponding distribution parameters. The network device may also include means for receiving, from the terminal device, a report comprising at least one of positioning measurements for positioning integrity or an identifier of one of the one or more IDGs associated with the positioning measurements. The network device may further include means for calculating one or more integrity parameters for the positioning integrity, based on the identifier of the one of the one or more IDGs.

Some exemplary embodiments may provide a method that includes communicating, with a network device, information including one or more integrity distribution groups (IDGs) and corresponding distribution parameters, and performing, by a terminal device, positioning measurements for positioning integrity. The method may also include determining, by the terminal device, one of the one or more IDGs based on the positioning measurements, and transmitting, to the network device, a report comprising at least one of the positioning measurements or an identifier of the determined IDG.

Some exemplary embodiments may also provide a method that includes communicating, by a network device with a terminal device, information including one or more integrity distribution groups (IDGs) and corresponding distribution parameters. The method may also include receiving, from the terminal device, a report that includes at least one of positioning measurements for positioning integrity or an identifier of one of the one or more IDGs associated with the positioning measurements. The method may further include calculating, by the network device, one or more integrity parameters for the positioning integrity, based on the identifier of the one of the one or more IDGs.

Various exemplary embodiments may provide a non-transitory computer readable medium including program instructions that, when executed by a terminal device, cause the terminal device at least to communicate, with a network device, information that includes one or more integrity distribution groups (IDGs) and corresponding distribution parameters. The terminal device may also perform positioning measurements for positioning integrity and determine one of the one or more IDGs based on the positioning measurements. The terminal device may further be caused to transmit, to the network device, a report comprising at least one of the positioning measurements or an identifier of the determined IDG.

Various exemplary embodiments may provide a non-transitory computer readable medium comprising program instructions that, when executed by a network device, cause the network device at least to communicate, with a terminal device, information that includes one or more integrity distribution groups (IDGs) and corresponding distribution parameters. The network device may also be caused to receive, from the terminal device, a report including at least one of positioning measurements for positioning integrity or an identifier of one of the one or more IDGs associated with the positioning measurements. The network device may also calculate one or more integrity parameters for the positioning integrity, based on the identifier of the one of the one or more IDGs.

Certain exemplary embodiments may provide one or more computer programs including instructions stored thereon for performing one or more of the methods described herein. Some exemplary embodiments may also provide one or more apparatuses including one or more circuitry configured to perform one or more of the methods described herein.

BRIEF DESCRIPTION OF THE DRAWINGS

For proper understanding of example embodiments, reference should be made to the accompanying drawings, as follows:

FIG. 3 illustrates an example of a flow diagram of a method according to various exemplary embodiments;

FIG. 4 illustrates another example of a flow diagram of a method according to some exemplary embodiments.

DETAILED DESCRIPTION

Figures 1, 2:
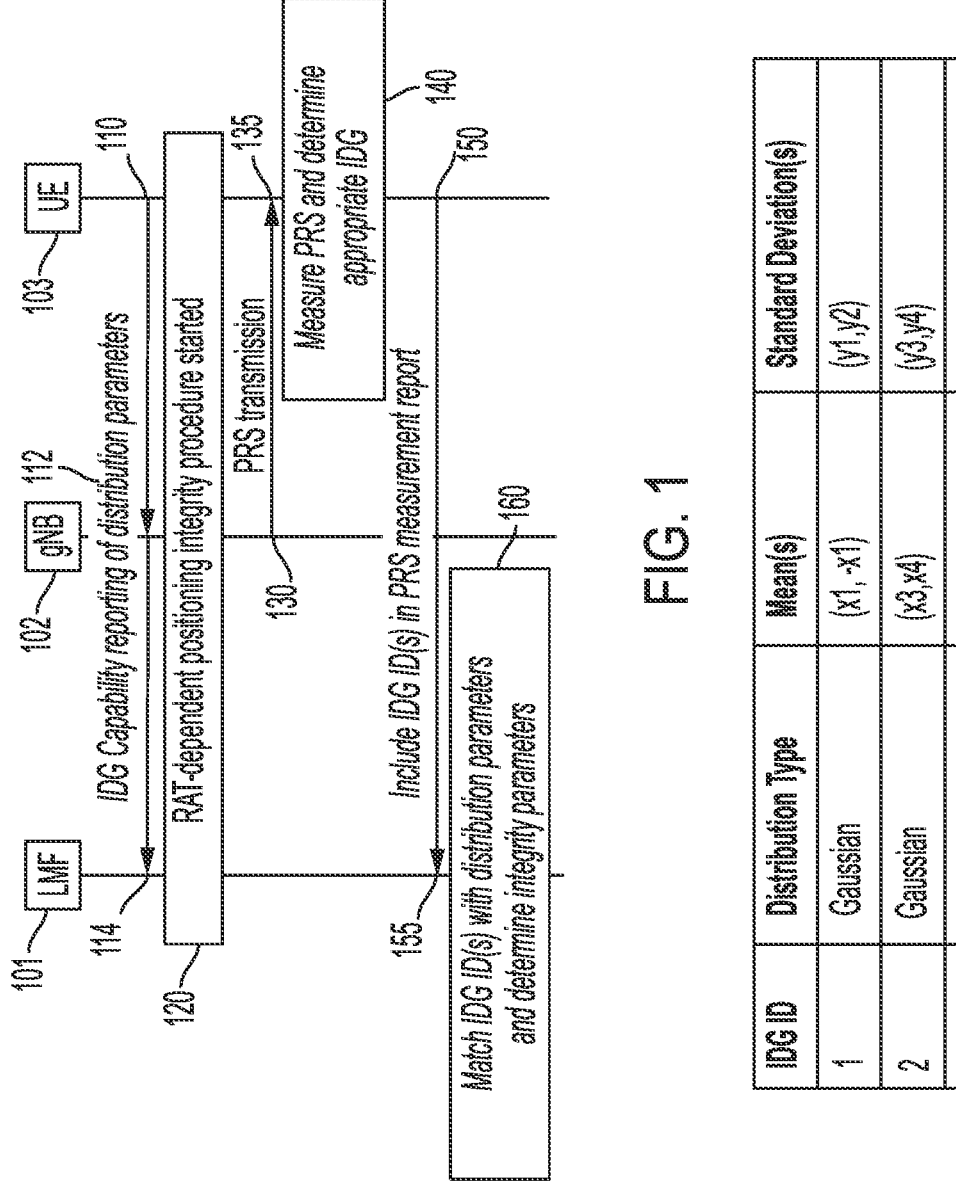
FIG. 1 illustrates an example of a signal flow of a user equipment (UE), a Next Generation NodeB (gNB) and a location management function (LMF) communicating to perform reporting of positioning integrity according to various exemplary embodiments.
FIG. 2 illustrates an example of a table for distribution parameters associated with an integrity distribution group according to various exemplary embodiments.

It will be readily understood that the components of certain example embodiments, as generally described and illustrated in the figures herein, may be arranged and designed in a wide variety of different configurations. The following is a detailed description of some exemplary embodiments of systems, methods, apparatuses, and non-transitory computer program products for reporting integrity measurement error distribution groups, which may be referred to hereinafter as integrity distribution groups (IDGs) that are based on measurement error as described in detail below. Although the devices discussed below and shown in the figures refer to 5G or Next Generation NodeB (gNB) devices and user equipment (UE) devices, this disclosure is not limited to only gNBs and UEs.

5G wireless systems may provide the ability for a mobile device or object to determines its relative location. Global Navigation Satellite System (GNSS) positioning may use one or more satellite signals to measure and/or detect the distance and/or relative position of a device, apparatus, node, and the like. GNSS may encompass global, regional, and augmentation satellite systems. Each GNSS may be used individually or in combination with others GNSSs, such as other global navigation systems, regional navigation systems and/or augmentation systems.

GNSS may be implemented with an NR network to function with an NG radio access network (NG-RAN). The NG-RAN may assist the UE GNSS receiver to improve the performance in several respects. The network-assisted GNSSs may utilize communications between UE GNSS receivers and a GNSS reference receiver network.

$3^{rd}$ Generation Partnership Project (3GPP) Release 17 (Rel-17) provided for the use of GNSS positioning integrity to be able to assess trust and availability of reliable positioning in order to avoid unwanted or hazardous situations due to inaccurate positioning. Positioning integrity may be considered a measure of the trust in the accuracy of the position-related data and the ability to provide timely warnings based on assistance data provided by the network. Positioning integrity may allow device to make informed determinations/decisions based on a reported position of the device or an object controlled by or functioning in cooperation with the device. For example, when monitoring a robotic arm, a device may decide whether arm movement of the robotic arm is within allowed limits to ensure safe operation of the robotic arm and surrounding objects and/or people.

The positioning integrity may be determined by a location management function (LMF) of a core network, the UE, or another device or node. The LMF may determine integrity results, such as a protection level of a horizontal positioning accuracy and vertical positioning accuracy. This may be referred to as LMF-based positioning integrity. Alternatively, the UE may determine the integrity results, which may be referred to as UE-based positioning integrity.

For LMF-based positioning integrity, one or more error sources for related measurements in a measurement report may cause a degradation of the integrity of the positioning accuracy. The measurements for positioning integrity may include estimating the distribution of integrity error sources, such as a reference signal time difference (RSTD) measurement error. For example, an error source for downlink (DL) time difference of arrival (TDOA) may be an RSTD measurement. As another example, an error source for uplink (UL) TDOA may be a relative time of arrival (RTOA) measurement. As a further example, for multi-cell round trip time (Multi-RTT), a UE receiver (Rx) to transmitter (Tx) time difference measurement may be an error source, and/or a gNB Rx-Tx time difference measurement may be an error source. As an even further example, at least an angle of arrival (AoA) or zenith angle of arrival (ZoA) measurement is an error source for UL-AoA. Examples of positioning measurements may include, for example, reference signal received power (RSRP), reference signal received path power (RSRPP), reference signal received quality (RSRQ), and/or quality of a first path of a positioning reference signal (PRS). In addition, the RSTD, RTOA, Rx-Tx time difference measurements may be obtained from sidelink (SL) PRSs. In addition, the LMF may be implemented in the UE, which may be referred to as a server UE. The server UE may receive positioning measurements and integrity parameters from another UE, such as a target UE. However, logically, the server UE may be considered a network entity.

GNSS integrity may implement paired Gaussian overbounding to bound the error sources and to compute integrity factors. It may be beneficial to evaluating positioning integrity to include an associated mean and standard deviation that is reported along with the measurement report. However, as a first consideration, the device, such as the UE, that performs the measurements may need to use long term averages to compute the mean and/or standard deviation values, which may be appropriate overbounds for unlikely error events. Calculating the mean and/or standard deviation values may use historical data based on a signal to noise ratio (SNR), signal to interference and noise ratio (SINR), reference signal received power (RSRP), and/or a similar metric, which may only reflect the current measurement as a rough approximation. Alternatively or in addition, as a second consideration, the overhead calculating and reporting the mean and/or standard deviation values with the measurement report may be more than a negligible amount because the UE may need to report multiple means and standard deviations, such as two means and two standard deviations, with every measurement report.

Various exemplary embodiments may advantageously address the above-described considerations by reducing the overhead required for positioning integrity reporting and/or reducing the power consumption and/or complexity of the UE (or other device performing the measurement and/or providing the measurement report).

According various exemplary embodiments, an apparatus, such as a UE, may be configured to report an integrity distribution group (IDG) and related identification or identifiers (IDs) as part of a positioning integrity report, such as an LMF-based integrity report. An IDG may be a group of distributions that represent one or more error sources in positioning integrity. The group of distributions may be combined into a single distribution, such as Gaussian paired overbounding. The LMF-based integrity report may indicate the positioning integrity of the positioning of the UE. The positioning integrity may be a measure of the trust in the accuracy of position-related data and the ability to provide timely warnings based on assistance data provided by the network. The network may include the UE, an LMF, and/or an access node, such as a base station or gNB.

The UE may provide a list of IDGs and associated distribution parameters for one or more of the list of IDGs to the LMF and/or the gNB. The UE may provide the list of IDGs and associated distribution parameters prior to performing or determining the timing related measurements. For example, the UE may provide the list of IDGs and associated distribution parameters during capability signaling or another type of upfront or preliminary signaling procedure. The distribution parameters may include one or more mean values, standard deviations, and/or distribution types associated with the IDGs.

As a non-limiting example, the UE may provide a list including IDG #1 and IDG #2. For the IDG #1, the UE may provide means x1 and x2 and standard deviations y1 and y2, and for IDG #2, the UE may provide means x3 and x4 and standard deviations y3 and y4. The means x1, x2, x3, and x4 and the standard deviations y1, y2, y3, and y4 may be the distribution parameters provided with the list of IDGs to the LMF.

Alternatively, instead of the UE providing the list of IDGs and the associated distribution parameters, the LMF may provide a list of IDGs and associated distribution parameters, which may include distribution type, mean, and/or standard deviation. The LMF may instruct the UE to report the ID of an IDG that matches the positioning measurement during the positioning procedures, as discussed in more detail below.

The UE may be configured to perform LMF-based integrity reporting. During LMF-based integrity reporting, the UE may be instructed or requested to report a distribution of a timing measurement error to at least the LMF. An access node on the network, such as the gNB, transmits a positioning reference signal (PRS) to the UE. The UE may then measure the PRS as part of radio access technology (RAT)- dependent positioning. For example, an RSTD measurement may be part of a DL-TDOA by receiving the PRS. The UE may determine the appropriate IDG based on the PRS measurement.

The UE may use an SNR, RSRP, reference signal received path power (RSRPP), reference signal received quality (RSRQ), quality of a first path of the PRS, or any combination thereof to determine and/or select the appropriate IDG. For example, the UE may measure or determine a high SNR for the PRS and may select an IDG with a low standard deviation. As another example, the UE may measure or determine a low SNR for the PRS and may select an IDG with a high standard deviation.

The UE reports the ID of the selected appropriate IDG (IDG ID) to the network, which may include the LMF, along with the measurement report. The UE may group all measurements which are associated with the same IDG ID together to further reduce the reporting overhead. In certain exemplary embodiments, the UE may provide the measurement report due to event-triggered reporting/updating.

Upon or after receiving the report of the IDG ID from the UE, the LMF may match the IDG ID to the previously reported distribution parameters and calculate one or more distribution parameters for the positioning integrity of the UE. The one or more distribution parameters for the positioning integrity may also be referred to as integrity parameters.

FIG. 1 illustrates an example of a signal flow for positioning integrity on a network that may include an LMF 101, a gNB 102, and a UE 103. At 110, the UE 103 may provide a list of IDGs and associated distribution parameters for one or more of the list of IDGs to the LMF 101. The UE 103 may also provide the list of IDGs and the associated distribution parameters to the gNB 102. The UE 103 may provide the list of IDGs and the associated distribution parameters during capability signaling. At 112, the gNB 102 receives and stores the list of IDGs and the associated distribution parameters. At 114, the LMF 103 receives and stores the list of IDGs and the associated distribution parameters.

For example, the UE 103 may provide a list including IDG #1 and IDG #2. For the IDG #1, the UE 103 may provide means x1 and x2 and standard deviations y1 and y2, and for IDG #2, the UE 103 may provide means x3 and x4 and standard deviations y3 and y4.

FIG. 2 illustrates another example of the list of IDGs and the associated distribution parameters in the form of a table. The list may include three IDG IDs (1, 2, 3) and the associated distribution parameters for each IDG ID. The distribution parameters for IDG ID 1 may indicate a gaussian distribution type, a means of (x1, −x1), and a standard deviation of (y1, y2). The distribution parameters for IDG ID 2 may indicate a gaussian distribution type, a means of (x3, −x4), and a standard deviation of (y3, y4). The distribution parameters for IDG ID 3 may indicate a uniform distribution type, a means of (0, 1), and a standard deviation of (1, 2).

As illustrated in FIG. 1, at 120, an RAT-dependent positioning integrity procedure may be initiated to determine the positioning integrity of the position measurement of the UE 103. Reference signals, physical layer measurements, and/or physical layer procedures may enable positioning based on NR carrier phase measurements for both UE-based and UE-assisted positioning. LMF may provide the UE 103 with a time period or a time window to be used to determine the IDG. Similarly, the UE 103 may provide a time period or a time window used to determine the IDG.

At 130, the gNB 102 may transmit a PRS to the UE 103. At 135, the UE 103 may receive the PRS, and at 140, the UE 103 may measure the PRS to determine an appropriate IDG based on the measurement of the PRS. The UE 103 may measure the PRS and may determine an error source for related measurements, such as RSTD, RTOA, UE Rx-Tx time difference, gNB Rx-Tx time difference, RSRP, RSRPP, RSRQ, and/or AoA or ZoA. The UE 103 then may determine or select an IDG of the list of IDGs previously provided to the LMF. The UE 103 may determine/select the IDG based on SNR, RSRP, RSRPP, RSRQ, quality of the first path, or any combination thereof. The UE may determine/select the IDG that has a mean and/or standard deviation that may be used to overbound the error of the measurement of the PRS.

At 150, the UE 103 may provide the ID of the determined/ selected IDG in or with a measurement report to the LMF 101. For example, the UE 103 may report (RSTD #1, IDG #1) and (RSTD #2, IDG #2). The UE 103 may provide the IDG ID using LTE positioning protocol (LPP), radio resource control (RRC), or medium access control (MAC) control element (MAC-CE). In some exemplary embodiments, the UE 103 may report in event-triggered reporting/ updating such that the UE 103 updates the IDG ID for one or more specific PRS resources and/or transmission and reception points (TRPs) when the UE 103 detects a change of the associated IDG corresponding to the PRS resources and/or TRPs.

In certain exemplary embodiments for a case in vehicle to everything (V2X) or other multiple panel use cases, the UE 103 may consider panel information in the reporting of IDG ID. For example, Rx panel and/or beam information may be reported together with the measurement report, such as (measurement #1, IDG #1, Rx panel #1). If the measurement is Rx-Tx time difference (UL+DL), then the Rx panel and/or beam information may be (measurement #1, IDG #1, Rx panel #1, Tx panel #1).

At 155, the LMF 101 may receive the IDG ID with the measurement report. At 160, the LMF 101 may match the received IDG ID to the previously reported distribution parameters and calculate one or more distribution (integrity) parameters for the positioning integrity of the UE 103. The LMF 101 may consider the distribution or bound of the IDG identified by the ID to represent a conservative estimate from the UE 103. Integrity may be used to ensure that real-world use cases or implementations appropriately assess trust and the availability of reliable location estimation to avoid situations that might result in injury or other harmful consequences due to the inaccurate positioning. For example, when the positioning integrity is evaluated to be insufficient due to large residual errors, the LMF 101 and/or the UE 103 may attempt to take precautionary actions to prevent any negative consequences. To evaluate the integrity for positioning measurements from the LMF 101 and/or the UE 103, the distribution, means, and standard deviation information may all be necessary and may be provided by the IDG ID.

According to some exemplary embodiments, the UE 103 may update the initially reported list of IDGs and associated distribution parameters after a certain amount of time or a trigger event, such as after learning of a change to the distributions. The UE 103 may use LPP or RRC messages to convey the update to the LMF 101, which would be event based. The UE 103 may also report the IDG ID associated with a specific TRP measurement or a specific PRS resource.

Although various exemplary embodiments described herein may refer to timing-based measurements, the exemplary embodiments are not limited to only timing-based measurements. The description herein may also apply to other types of measurements, such as carrier phase measurements, angle measurement, and/or power measurements.

Further, although various exemplary embodiments described herein may refer to DL positioning where the UE 103 may be performing the measurements, the exemplary embodiments are not limited to the UE 103 performing the measurements. The description herein may also apply to UL positioning where the TRP/gNB/LMF may perform the measurements.

FIG. 3 illustrates an example flow diagram of a method, according to various exemplary embodiments. In an exemplary embodiment, the method of FIG. 3 may be performed by a network element, or a group of multiple network elements in a 3GPP system, such as LTE or 5G-NR. For instance, in an exemplary embodiment, the method of FIG. 3 may be performed by a UE similar to apparatus 510 illustrated in FIG. 5.

According to various exemplary embodiments, the method of FIG. 3 may include, at 310, communicating, with a network device similar to apparatus 520, information including one or more integrity distribution groups (IDGs) and corresponding distribution parameters. At 320, the method may perform, by the apparatus 510, measurements for positioning integrity.

At 330, the method may determine or select one of the one or more IDGs based on the measurements, and at 340, the method may perform transmitting, to the apparatus 520, a report including at least one of the measurements and/or an identifier of the determined IDG.

According to various exemplary embodiments, the apparatus 510 may transmit the information including one or more IDGs and corresponding distribution parameters to the apparatus 520. Alternatively, according to some exemplary embodiments, the apparatus 510 may receive the information including one or more IDGs and corresponding distribution parameters from the apparatus 520.

According to some exemplary embodiments, the corresponding distribution parameters for each of the one or more IDGs may include one or more of the following: means, standard deviations, and a distribution type.

According to certain exemplary embodiments, one or more integrity parameters may be calculable by the apparatus 520 by matching the identifier of the determined IDG in the report to the communicated corresponding distribution parameters.

According to various exemplary embodiments, the one of the one or more IDGs is determined based on at least one parameter of a signal to noise ratio, reference signal received power, reference signal received path power, reference signal received quality, or quality of a first path of the PRS. The at least one parameter may be measured in a time window.

According to certain exemplary embodiments, the apparatus 510 may be caused to transmit, to the apparatus 520, a plurality of reports, including the report, corresponding to the same identifier of the determined IDG. According to some exemplary embodiments, the apparatus 510 may be caused to transmit, to the apparatus 520, reception antenna panel information or transmission antenna panel information associated with the identifier of the determined IDG and the measurements in the report.

FIG. 4 illustrates an example flow diagram of a method, according to certain exemplary embodiments. In an example embodiment, the method of FIG. 4 may be performed by a network element, or a group of multiple network elements in a 3GPP system, such as LTE or 5G-NR. For instance, in an exemplary embodiment, the method of FIG. 4 may be performed by an LMF similar to apparatus 520 illustrated in FIG. 5.

According to various exemplary embodiments, the method of FIG. 4 may include, at 410, communicating, with a terminal device similar to the apparatus 510, information including one or more integrity distribution groups (IDGs) and corresponding distribution parameters.

At 420, the method may receive, from the apparatus 510, a report including at least one of measurements for positioning integrity and/or an identifier of one of the one or more IDGs associated with the measurements. At 430, the method may calculate one or more integrity parameters for the positioning integrity based on the identifier of the one of the one or more IDGs.

According to certain exemplary embodiments, the apparatus 520 may transmit the information including one or more IDGs and corresponding distribution parameters to the apparatus 510. Alternatively, according to some exemplary embodiments, the apparatus 520 may receive the information including one or more IDGs and corresponding distribution parameters from the apparatus 510.

According to various exemplary embodiments, the corresponding distribution parameters for each of the one or more IDGs may include one or more of the following: means, standard deviations, and a distribution type.

According to some exemplary embodiments, the apparatus 520 may match the identifier of the one of the one or more IDGs to the communicated corresponding distribution parameters when calculating the one or more integrity parameters for the positioning integrity.

According to some exemplary embodiments, the apparatus 520 may be caused to receive, from the apparatus 510, a plurality of reports, including the report, corresponding to the same identifier of the one of the one or more IDGs. According to certain exemplary embodiments, the apparatus 520 may be caused to receive, from the apparatus 510, reception antenna panel information or transmission antenna panel information associated with the identifier of the determined IDG and the measurements in the report.

Figure 5:
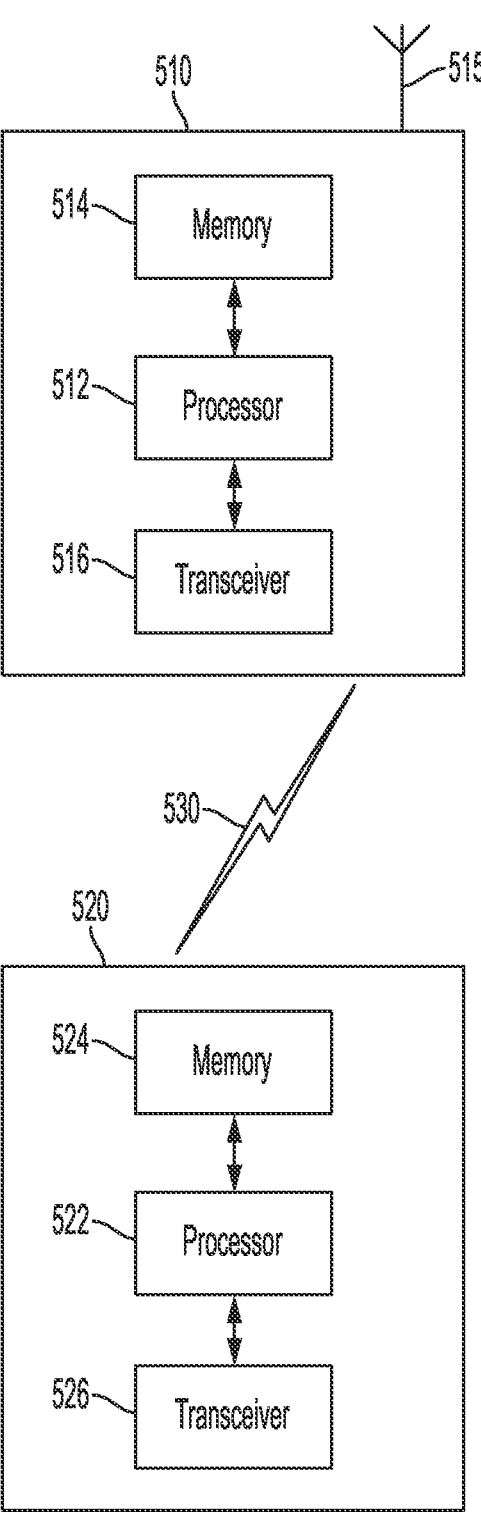
FIG. 5 illustrates a set of apparatuses according to various exemplary embodiments.

FIG. 5 illustrates a set of apparatuses 510 and 520 according to various exemplary embodiments. In the various exemplary embodiments, the apparatus 510 may be an element in a communications network or associated with such a network, such as a UE, RedCap UE, SL UE, mobile equipment (ME), mobile station, mobile device, stationary device, IoT device, or other device. UE 103 may be an example of apparatus 510 according to various exemplary embodiments as discussed above. It should be noted that one of ordinary skill in the art would understand that apparatus 510 may include components or features not shown in FIG. 5. In addition, apparatus 520 may be a part of the core network, a network entity or a sub-component or processing functions of a network entity of computation device connected to the network, such as a location management function (LMF). For example, LMF 101 may be an example of apparatus 520 according to various exemplary embodiments as discussed above. It should be noted that one of ordinary skill in the art would understand that apparatus 520 may include components or features not shown in FIG. 5.

According to various exemplary embodiments, the apparatus 510 may include at least one processor, and at least one memory, as shown in FIG. 5. The memory may store instructions that, when executed by the processor, cause the apparatus 510 to communicate, with a network device similar to apparatus 520, information including one or more integrity distribution groups (IDGs) and corresponding distribution parameters.

Further, according to various exemplary embodiments, the apparatus 510 may be further caused to perform, by the apparatus 510, measurements for positioning integrity, and to determine one of the one or more IDGs based on the measurements. The apparatus 510 may also be cause to transmit, to the apparatus 520, a report comprising at least one of the measurements and/or an identifier of the determined IDG.

According to various exemplary embodiments, the apparatus 520 may include at least one processor, and at least one memory, as shown in FIG. 5. The memory may store instructions that, when executed by the processor, cause the apparatus 520 to communicate, with the apparatus 510, information including one or more IDGs and corresponding distribution parameters.

According to certain exemplary embodiments, the apparatus 520 may also be caused to receive, from the apparatus 510, a report including at least one of the measurements for positioning integrity and/or an identifier of one of the one or more IDGs associated with the measurements. The apparatus 520 may further be caused to calculate one or more integrity parameters for the positioning integrity based on the identifier of the one of the one or more IDGs.

Various exemplary embodiments described above may provide several technical improvements, enhancements, and/or advantages. For instance, in some exemplary embodiments, it may be possible to reduce the overhead required for positioning integrity reporting, and reduce the power consumption and complexity of the UE, or other device performing the measurement and/or providing the measurement report.

In some example embodiments, apparatuses 510 and/or 520 may include one or more processors, one or more computer-readable storage medium (for example, memory, storage, or the like), one or more radio access components (for example, a modem, a transceiver, or the like), and/or a user interface. In some example embodiments, apparatuses 510 and/or 520 may be configured to operate using one or more radio access technologies, such as GSM, LTE, LTE-A, NR, 5G, WLAN, WiFi, NB-IoT, Bluetooth, NFC, MulteFire, and/or any other radio access technologies.

As illustrated in the example of FIG. 5, apparatuses 510 and/or 520 may include or be coupled to processors 512 and 522, respectively, for processing information and executing instructions or operations. Processors 512 and 522 may be any type of general or specific purpose processor. In fact, processors 512 and 522 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 512 (and 522) for each of apparatuses 510 and/or 520 is shown in FIG. 5, multiple processors may be utilized according to other example embodiments. For example, it should be understood that, in certain example embodiments, apparatuses 510 and/or 520 may include two or more processors that may form a multiprocessor system (for example, in this case processors 512 and 522 may represent a multiprocessor) that may support multiprocessing. According to certain example embodiments, the multiprocessor system may be tightly coupled or loosely coupled to, for example, form a computer cluster).

Processors 512 and 522 may perform functions associated with the operation of apparatuses 510 and/or 520, respectively, including, as some examples, precoding of antenna gain/phase parameters, encoding and decoding of individual bits forming a communication message, formatting of information, and overall control of the apparatuses 510 and/or 520, including processes illustrated in FIGS. 1, 3, and 4.

Apparatuses 510 and/or 520 may further include or be coupled to memory 514 and/or 524 (internal or external), respectively, which may be coupled to processors 512 and 522, respectively, for storing information and instructions that may be executed by processors 512 and 522. Memory 514 (and memory 524) may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 514 (and memory 524) can be comprised of any combination of random access memory (RAM), read only memory (ROM), static storage such as a magnetic or optical disk, hard disk drive (HDD), or any other type of non-transitory machine or computer readable media. The instructions stored in memory 514 and memory 524 may include program instructions or computer program code that, when executed by processors 512 and 522, enable the apparatuses 510 and/or 520 to perform tasks as described herein.

In certain example embodiments, apparatuses 510 and/or 520 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processors 512 and 522 and/or apparatuses 510 and/or 520 to perform any of the methods illustrated in FIGS. 1, 3, and 4.

In some exemplary embodiments, apparatus 510 may also include or be coupled to one or more antennas 515 for receiving a downlink signal and for transmitting via an uplink from apparatus 510. Apparatuses 510 and/or 520 may further include transceivers 516 and 526, respectively, configured to transmit and receive information. The transceiver 516 and 526 may also include a radio interface that may correspond to a plurality of radio access technologies including one or more of GSM, LTE, LTE-A, 5G, NR, WLAN, NB-IoT, Bluetooth, BT-LE, NFC, RFID, UWB, or the like. The radio interface may include other components, such as filters, converters (for example, digital-to-analog converters or the like), symbol demappers, signal shaping components, an Inverse Fast Fourier Transform (IFFT) module, or the like, to process symbols, such as OFDMA symbols, carried by a downlink or an uplink.

For instance, transceivers 516 and 526 may be respectively configured to modulate information on to a carrier waveform for transmission, and demodulate received information for further processing by other elements of apparatuses 510 and/or 520. In other example embodiments, transceivers 516 and 526 may be capable of transmitting and receiving signals or data directly. Additionally or alternatively, in some example embodiments, apparatuses 510 and/or 520 may include an input and/or output device (I/O device). In certain example embodiments, apparatuses 510 and/or 520 may further include a user interface, such as a graphical user interface or touchscreen.

In certain example embodiments, memory 514 and memory 524 store software modules that provide functionality when executed by processors 512 and 522, respectively. The modules may include, for example, an operating system that provides operating system functionality for apparatuses 510 and/or 520. The memory may also store one or more functional modules, such as an application or program, to provide additional functionality for apparatuses 510 and/or 520. The components of apparatuses 510 and/or 520 may be implemented in hardware, or as any suitable combination of hardware and software. According to certain example embodiments, apparatus 510 may optionally be configured to communicate with apparatus 520 via a wireless or wired communications link 530 according to any radio access technology, such as NR.

According to certain example embodiments, processors 512 and 522, and memory 514 and 524 may be included in or may form a part of processing circuitry or control circuitry. In addition, in some example embodiments, transceivers 516 and 526 may be included in or may form a part of transceiving circuitry.

As used herein, the term "circuitry" may refer to hardware-only circuitry implementations (for example, analog and/or digital circuitry), combinations of hardware circuits and software, combinations of analog and/or digital hardware circuits with software/firmware, any portions of hardware processor(s) with software, including digital signal processors, that work together to cause an apparatus (for example, apparatus 510 and/or 520) to perform various functions, and/or hardware circuit(s) and/or processor(s), or portions thereof, that use software for operation but where the software may not be present when it is not needed for operation. As a further example, as used herein, the term "circuitry" may also cover an implementation of merely a hardware circuit or processor or multiple processors, or portion of a hardware circuit or processor, and the accompanying software and/or firmware. The term circuitry may also cover, for example, a baseband integrated circuit in a server, cellular network node or device, or other computing or network device.

A computer program product may include one or more computer-executable components which, when the program is run, are configured to carry out some example embodiments. The one or more computer-executable components may be at least one software code or portions of it. Modifications and configurations required for implementing functionality of certain example embodiments may be performed as routine(s), which may be implemented as added or updated software routine(s). Software routine(s) may be downloaded into the apparatus.

As an example, software or a computer program code or portions of it may be in a source code form, object code form, or in some intermediate form, and it may be stored in some sort of carrier, distribution medium, or computer readable medium, which may be any entity or device capable of carrying the program. Such carriers may include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers. The computer readable medium or computer readable storage medium may be a non-transitory medium.

In other example embodiments, the functionality may be performed by hardware or circuitry included in an apparatus (for example, apparatuses 510 and/or 520), for example through the use of an application specific integrated circuit (ASIC), a programmable gate array (PGA), a field programmable gate array (FPGA), or any other combination of hardware and software. In yet another example embodiment, the functionality may be implemented as a signal, a non-tangible means that can be carried by an electromagnetic signal downloaded from the Internet or other network.

According to certain example embodiments, an apparatus, such as a node, device, or a corresponding component, may be configured as circuitry, a computer or a microprocessor, such as single-chip computer element, or as a chipset, including at least a memory for providing storage capacity used for arithmetic operation and an operation processor for executing the arithmetic operation.

The features, structures, or characteristics of example embodiments described throughout this specification may be combined in any suitable manner in one or more example embodiments. For example, the usage of the phrases "certain embodiments," "an example embodiment," "some embodiments," or other similar language, throughout this specification refers to the fact that a particular feature, structure, or characteristic described in connection with an embodiment may be included in at least one embodiment. Thus, appearances of the phrases "in certain embodiments," "an example embodiment," "in some embodiments," "in other embodiments," or other similar language, throughout this specification do not necessarily refer to the same group of embodiments, and the described features, structures, or characteristics may be combined in any suitable manner in one or more example embodiments. Further, the terms "cell", "node", "gNB", or other similar language throughout this specification may be used interchangeably.

As used herein, "at least one of the following: <a list of two or more elements>" and "at least one of <a list of two or more elements>" and similar wording, where the list of two or more elements are joined by "and" or "or," mean at least any one of the elements, or at least any two or more of the elements, or at least all the elements.

One having ordinary skill in the art will readily understand that the disclosure as discussed above may be practiced with procedures in a different order, and/or with hardware elements in configurations which are different than those which are disclosed. Therefore, although the disclosure has been described based upon these example embodiments, it would be apparent to those of skill in the art that certain modifications, variations, and alternative constructions would be apparent, while remaining within the spirit and scope of example embodiments. Although the above embodiments refer to 5G NR and LTE technology, the above embodiments may also apply to any other present or future 3GPP technology, such as LTE-advanced, and/or fourth generation (4G) technology.

| Partial Glossary: | |
| --- | --- |
| 3GPP | 3rd Generation Partnership Project |
| 5G | 5th Generation |
| 5GCN | 5G Core Network |
| AoA | Angle of Arrival |
| DL | Downlink |
| EMBB | Enhanced Mobile Broadband |
| gNB | 5G or Next Generation NodeB |
| GNSS | Global Navigation Satellite System |
| IDG | Integrity Distribution Group |
| LMF | Location Management Function |
| LPP | LTE Positioning Protocol |
| LTE | Long Term Evolution |
| MAC | Medium Access Control |

-continued

| Partial Glossary: | |
| --- | --- |
| MAC-CE | Medium Access Control - Control Element |
| Multi-RTT | Multi-Cell Round Trip Time |
| NR | New Radio |
| PRS | Positioning Reference Signal |
| RAN | Radio Access Network |
| RAT | Radio Access Technology |
| RRC | Radio Resource Control |
| RSRP | Reference Signal Received Power |
| RSRPP | Reference Signal Received Path Power |
| RSRQ | Reference Signal Received Quality |
| RSTD | Reference Signal Time Difference |
| RTOA | Relative Time of Arrival |
| Rx | Receiver |
| SINR | Signal to Interference and Noise Ratio |
| SNR | Signal to Noise Ratio |
| TDOA | Time Difference of Arrival |
| Tx | Transmitter |
| UE | User Equipment |
| UL | Uplink |
| URLLC | Ultra Reliable Low Latency Communication |
| ZoA | Zenith Angle of Arrival |

We claim:

1. A terminal device comprising:

at least one processor; and at least one memory storing instructions that, when executed by the at least one processor, cause the terminal device at least to perform the following operations:

communicating, with a network device comprising a Location Management Function (LMF), information consisting of two integrity distribution groups (IDGs), each IDG being a Gaussian distribution that represents a Reference Signal Time Difference (RSTD) measurement error as an error source for downlink time difference of arrival (DL-TDOA), the information including, for each IDG, two mean values and two standard deviation values;

performing positioning measurements for positioning integrity by:

receiving a Positioning Reference Signal (PRS) transmitted by a Next Generation NodeB (gNB); and measuring the PRS to obtain the RSTD measurement;

determining one of the one or more IDGs based on at least one parameter of the following: a reference signal received power, a reference signal received path power, a reference signal received quality, a quality of a first path of the PRS; and a signal-to-noise ratio (SNR) measured for the received PRS, wherein a high SNR measurement selects an IDG with a lower standard deviation and a low SNR measurement selects an IDG with a higher standard deviation; and transmitting, to the network device, a report comprising (i) the RSTD measurement and (ii) an identifier of the selected one of the exactly two IDGs, the report being provided using Long Term Evolution (LTE) Positioning Protocol (LPP).

2. The terminal device of claim 1, wherein the report further comprises reception panel information indicating a receive antenna panel of the terminal device used for obtaining the PRS.

3. The terminal device of claim 2, wherein the transmitting of the report is triggered only upon detecting a change in the identifier of the selected IDG corresponding to a specific transmission reception point (TRP).

4. The terminal device of claim 3, wherein the determining of one of the IDGs is further based on a time window indicated by the Location Management Function (LMF) during the positioning procedure.

5. The terminal device of claim 4, wherein the communicating of the two IDGs and corresponding distribution parameters is performed during capability signaling prior to initiation of the positioning procedure.

6. The terminal device of claim 5, wherein the terminal device is further configured to update the communicated two IDGs and the corresponding distribution parameters in response to a detected change in at least one of the distributions.

7. A system comprising:
a terminal device;
at least one processor; and
at least one memory storing instructions that, when executed by the at least one processor, cause the terminal device at least to perform the following operations:
communicating, with a network device comprising a Location Management Function (LMF), information consisting of two integrity distribution groups (IDGs), each IDG being a Gaussian distribution that represents a Reference Signal Time Difference (RSTD) measurement error as an error source for downlink time difference of arrival (DL-TDOA), the information including, for each IDG, two mean values and two standard deviation values;
performing positioning measurements for positioning integrity by:
receiving a Positioning Reference Signal (PRS) transmitted by a Next Generation NodeB (gNB); and
measuring the PRS to obtain the RSTD measurement;
determining one of the one or more IDGs based on at least one parameter of the following: a reference signal received power, a reference signal received path power, a reference signal received quality, a quality of a first path of the PRS; and a signal-to-noise ratio (SNR) measured for the received PRS, wherein a high SNR measurement selects an IDG with a lower standard deviation and a low SNR measurement selects an IDG with a higher standard deviation; and
transmitting, to the network device, a report comprising (i) the RSTD measurement and (ii) an identifier of the selected one of the exactly two IDGs, the report being provided using Long Term Evolution (LTE) Positioning Protocol (LPP).

8. The system of claim 7, wherein the report further comprises reception panel information indicating a receive antenna panel of the terminal device used for obtaining the PRS.

9. The system of claim 8, wherein the transmitting of the report is triggered only upon detecting a change in the identifier of the selected IDG corresponding to a specific transmission reception point (TRP).

10. The system of claim 9, wherein the determining of one of the IDGs is further based on a time window indicated by the Location Management Function (LMF) during the positioning procedure.

11. The system of claim 10, wherein the communicating of the two IDGs and corresponding distribution parameters is performed during capability signaling prior to initiation of the positioning procedure.

12. The system of claim 11, wherein the terminal device is further configured to update the communicated two IDGs and the corresponding distribution parameters in response to a detected change in at least one of the distributions.

13. A method performed by a terminal device, the method comprising:
communicating, with a network device comprising a Location Management Function (LMF), information consisting of two integrity distribution groups (IDGs), each IDG being a Gaussian distribution that represents a Reference Signal Time Difference (RSTD) measurement error as an error source for downlink time difference of arrival (DL-TDOA), the information including, for each IDG, two mean values and two standard deviation values;
performing positioning measurements for positioning integrity by:
receiving a Positioning Reference Signal (PRS) transmitted by a Next Generation NodeB (gNB); and
measuring the PRS to obtain the RSTD measurement;
determining one of the one or more IDGs based on at least one parameter of the following: a reference signal received power, a reference signal received path power, a reference signal received quality, a quality of a first path of the PRS; and a signal-to-noise ratio (SNR) measured for the received PRS, wherein a high SNR measurement selects an IDG with a lower standard deviation and a low SNR measurement selects an IDG with a higher standard deviation; and
transmitting, to the network device, a report comprising (i) the RSTD measurement and (ii) an identifier of the selected one of the exactly two IDGs, the report being provided using Long Term Evolution (LTE) Positioning Protocol (LPP).

14. The method of claim 13, wherein the report further comprises reception panel information indicating a receive antenna panel of the terminal device used for obtaining the PRS.

15. The method of claim 14, wherein the transmitting of the report is triggered only upon detecting a change in the identifier of the selected IDG corresponding to a specific transmission reception point (TRP).

16. The method of claim 15, wherein the determining of one of the IDGs is further based on a time window indicated by the Location Management Function (LMF) during the positioning procedure.

17. The method of claim 16, wherein the communicating of the two IDGs and corresponding distribution parameters is performed during capability signaling prior to initiation of the positioning procedure.

18. The method of claim 17, further comprising updating the communicated two IDGs and the corresponding distribution parameters in response to a detected change in at least one of the distributions.

* * * * *